F. H. HOPKINS.
DIFFERENTIAL PRESSURE GAGE.
APPLICATION FILED NOV. 7, 1917.

1,363,415.

Patented Dec. 28, 1920.

Inventor:
Frank H. Hopkins,
By Wright, Brown Quinby & Way
Attorneys.

UNITED STATES PATENT OFFICE.

FRANK H. HOPKINS, OF SOMERVILLE, MASSACHUSETTS, ASSIGNOR TO AMERICAN STEAM GAUGE & VALVE MANUFACTURING COMPANY, OF BOSTON, MASSACHUSETTS, A CORPORATION OF MASSACHUSETTS.

DIFFERENTIAL-PRESSURE GAGE.

1,363,415.    Specification of Letters Patent.    Patented Dec. 28, 1920.

Application filed November 7, 1917. Serial No. 200,712.

*To all whom it may concern:*

Be it known that I, FRANK H. HOPKINS, a citizen of the United States, residing at Somerville, in the county of Middlesex and State of Massachusetts, have invented new and useful Improvements in Differential-Pressure Gages, of which the following is a specification.

The present invention relates to instruments for measuring fluid pressures, and particularly to that class of such instruments which measures the difference of two pressures existing in fluids. The invention has for its objects, among others, to provide means in an instrument of this character for measuring and indicating not only the difference between pressures, but also the exact amount of either pressure separately; to eliminate friction of moving parts as far as possible; to reduce the number of parts subject to wear, in an instrument of this character, to the minimum; and to secure substantially exact accuracy of indication of all pressures, with substantially equal movements of the indicator for equal increments or decrements of pressure and of pressure differences. The invention consists in means for accomplishing the foregoing objects, and others, hereinafter described and claimed, and in the principles embodied in the particular form of such means illustrated in the accompanying drawings and described in detail.

The drawings forming a part of this application show a differential pressure gage embodying my invention; and in said drawings, Figure 1 is a front elevation of the gage with the dial, pointer and glass cover plate partly broken away.

Fig. 2 is a cross section on line 2—2 of Fig. 1.

Fig. 3 represents a detail of construction embodying the connection between two Bourdon spring tubes, as seen from below and from the right of line 3—3 of Fig. 1.

Fig. 4 is a detail view as seen from below the line 4—4 of Fig. 1 looking upward.

The same reference characters indicate the same parts in all the figures.

The invention is here shown as embodied in a gage of the Bourdon spring tube type, wherein the pressure measuring or weighing elements are flexible tubes of flattened cross section curved into a substantially circular arc. Two such spring tubes are employed, and they are arranged in a peculiar manner, presently described, which forms one of the features of my invention which I here claim. The operating parts of the gage are here shown as mounted in a case of common construction, having a back wall or base 5 provided with a flange 6 for attaching it to a support, and a cylindrical wall 7; the latter being provided with an internal shoulder 8 and tapped posts 9 to support an indicating dial 10; and externally threaded at 11 to mount the detachable ring 12 which carries a glass plate 13 forming the front wall or cover of the case, as usual in instruments of this sort.

The Bourdon spring tubes, are designated 14 and 15. These are the pressure measuring elements of the gage, and will be hereinafter so called. As here shown they are constructed according to the well understood principles and methods involved in the common Bourdon tubes. The tube 14 is mounted at one end upon a socket or block 16 (Fig. 4), which is mounted on, preferably being an integral part of, a plate 17 which is secured inside of the case to the back wall 5 of the latter. This plate has two threaded stems or nipples 18 and 19 which pass through the back wall and are adapted to be connected with pipes conveying fluids of which the pressures and pressure differences are to be measured. The nipple 18 has a bore passing into the interior of the socket 16 and so into communication with the Bourdon spring 14. The other nipple 19 is in communication with a tube 20, here shown as substantially a capillary tube, the purpose and function of which will be presently explained in detail.

The Bourdon spring tube 15 is mounted over or in front of the spring tube 14, and is connected at one of its ends with the free end of the latter, as shown in detail in Fig. 3. The connecting means comprises a plate 21 having plugs or bosses 22 and 23 which enter the adjacent ends of the tubes 14 and 15, and are soldered therein, the plate 21 covering the ends of said tubes and hermetically sealing the same. On the outer side of the plate 21 is a stiffening flange or rib 24. This connection is a rigid one, securing the tube 15 to the tube 14 in a manner which makes any angular movement of one tube with respect to the other at the point of connection impossible. These spring tubes are substantially the same in dimensions and form in cross section and curvature and in their resistance to distortion by internal or external pressure; in other words, they are as nearly alike as possible and are substantially equally distorted by equal pressures.

The connection 21 previously described, provides the support or abutment for the spring tube 15. The free end of the latter is connected to the indicator movement of the gage, carrying a lug or finger 25 to which is pivoted one end of a link 26, the other end of which is pivoted to an arm 27 of segment 28 which meshes with a pinion on a staff 29 carrying the pointer or indicating hand 30. The movement last described is the same as that widely known and used in standard makes of Bourdon gages, and therefore I have not deemed it necessary to illustrate all details of the same. My present invention does not necessitate any modification in the standard movement, and may be used with any one of several movements already known or which may be devised.

The capillary tube 20, previously described, extends from its connection with the nipple 19 around the Bourdon tubes into communication with the tube 15, which it enters through a passage 31 in the connection 21.

32 represents a capillary tube which is in communication with the spring tube 15 and is provided to permit filling of the latter with a liquid capable of transmitting pressures and making unnecessary the entrance of the vapor, gas, or liquid of which the pressures are to be measured, into the spring tube. After filling the latter the end of the tube 32 is sealed. The purpose of filling the tube 15 as above described is simply to avoid the delay in making the correct pressure indication which would be occasioned if the fluid to be measured were required to flow through the capillary tube 20 and fill the spring tube. This filling tube 32 is so arranged as to provide a point of connection for a compensating spring 33, one end of which is hooked around the filling tube 32 and the other end is connected to an adjusting screw 34 which passes through a lug 35 attached to the supported end of the spring tube 15, and on which are threaded adjusting lock nuts 36, 37 abutting against opposite sides of the lug. The capillary tube 20 necessarily has a certain amount of stiffness which resists displacement of the free end of the spring tube 14, and the compensating spring 33 is provided to oppose an equal resistance to distortion of the spring tube 15 and also to compensate for any unavoidable slight difference between tubes 14 and 15. Arranging the tube 20 so as to follow the circuit of the spring tubes causes its impedance of the free movement of the spring tube 14 when distorted by pressure to be of the least possible amount. It will be apparent from the foregoing description that the spring tubes 14 and 15 receive pressures from different sources and that each is distorted independently of the other by the actuating pressure. When pressure greater than atmospheric is directed into the tube 14, the free (left hand) end of the latter is displaced to the left, carrying with it the connected spring tube 15. Likewise pressures greater than atmospheric directed into the spring tube 15 through the capillary tube 20 cause the free (right hand) end of the spring tube to be displaced to the right. If the pressures in the two spring tubes are equal, the result is that the connection of the tube 15 with the indicator movement remains stationary, but if either pressure is greater than the other, the connector 25 moves to the left or the right according respectively as the pressure in the tube 14 is greater or less than that in the tube 15. When the internal pressures in the spring tubes are less than atmospheric, that is, when either tube is affected by vacuum, the specific movements of the parts are in respectively opposite directions to those above described. The instrument may equally well be used as a pressure gage or a vacuum gage, and nothing in the foregoing description is to be taken as a limitation in the range of its use. Likewise the specific directions of movement above described apply simply to the instrument here illustrated and are not to be construed as limiting the construction, form, or arrangement of the gage or any part thereof.

Among the advantages of the invention hereinbefore described are the following. First, the differential feature does not add any pivotal connections, that is, any parts which are subject to wear, additional to those required in the ordinary simple pressure gage; second, the two spring tubes do not oppose or work against one another, but each moves practically as freely as though the other were not there. The increased frictional resistance to movement, and wear of parts, which are inherent in differential spring tube gages of the types heretofore generally used are avoided in my gage. Third, each spring tube may be employed independently of the other for measuring and indicating pressures accurately. This is due to the fact that neither impedes the distortion of the other and that the mounting of the floating spring tube 15 on the supporting spring tube 14 is not disturbed as to its position when pressure is admitted to the tube 15 alone. Fourth the pressure differences are indicated accurately whatever the specific pressures may be and whether such pressures are great or small owing to the fact that one of the pressure-measuring tubes is carried by the other. For example, if the difference between the two pressures is five pounds, this difference is indicated correctly whether the specific pressures are one hundred pounds and ninety-five pounds, respectively, or ten and five pounds, respectively, or any other specific values.

I do not restrict the invention to the specific type of gage hereinbefore described having Bourdon tubes, but include within the protection which I claim, gages having any sort of members adapted to be distorted or displaced by an increase or decrease of the internal pressure above or below the atmospheric pressure, provided only a plurality of such members are employed, and they are connected in such manner that that part which operates the indicator is urged to move in respectively opposite directions by pressures of the same characters or sorts acting in the different members. Furthermore, in the type of instrument embodying Bourdon tubes, I am not necessarily restricted to the arrangement in which the tubes are coaxial and in parallel, covering the same arc, as here shown, provided they are so connected and arranged that the movable part of the tube which actuates the indicator is urged in opposite direction by the two pressures, as above set forth. Thus I may arrange the tubes as complemental parts of a single arc having an extent of substantially 360°; and I may if desirable, make them out of a tube which is a structurally integral unit having approximately 360° of arc, but divided midway between its ends into two distinct chambers. The terms "tube" and "pressure distorted member" in the following claims are intended to include all means equivalent to the Bourdon tubes hereinbefore described which are capable of effecting the results set forth.

The expression "pressure of the same character" used above and in certain of the claims, has reference to the relation of the pressure to the atmospheric pressure. That is, pressures which are either both above atmospheric or both below atmospheric are considered to be of the same sort or character, while pressures of which one is above and the other below atmospheric are of different sorts or characters.

What I claim and desire to secure by Letters Patent is:

1. A differential pressure gage, comprising two pressure receiving and measuring members, closed against communication with one another, one being fixed at one point and having a movable portion, and the other being mounted upon said movable portion and being movable therewith, but having itself a relatively movable portion, an indicator connected with the last identified movable portion, and means for conducting pressures separately to the members.

2. A differential pressure gage, comprising two Bourdon tubes coaxially arranged, one being fixed at one end, its other end being free to move, and the second being mounted at one end on the movable end of the first tube, but closed against communication therewith, indicator-operating means connected with the opposite end of the second tube, and means for separately conducting pressures to said tubes.

3. A differential pressure gage, comprising two Bourdon tubes coaxially arranged, one being fixed at one end, its other end being free to move, and the second being mounted at one end on the movable end of the first tube, but closed against communication therewith, indicator-operating means connected with the opposite end of the second tube, the means for so conducting pressure to the aforesaid second tube being a flexible conduit attached thereto at or near the connection thereof with the first tube.

4. A differential pressure gage comprising two Bourdon tubes coaxially arranged, one being fixed at one end, its other end being free to move, and the second being mounted at one end on the movable end of the first tube, but closed against communication therewith, indicator-operating means connected with the opposite end of the second tube, a curved conduit for conducting pressure to the second tube connected thereto at a point near the point of connection with the first tube, and a spring arranged to resist pressure-effected distortion of the second tube.

5. A differential pressure gage comprising two flexible members adapted to be distorted by fluid pressure and having resilience to resist such distortion, means for separately conducting fluid pressures to said members, each member being closed against communication of such pressure from one to the other, a fixed support for a part of one of said members, rigid connecting means between the movable part of said member and the second member supporting the latter member and arranged in such manner that the pressure-induced distortions of the second member take place in directions opposite to distortions caused in the first member by pressures of the same character, and indicating means operable by the distortable part of the second member only.

6. A differential pressure gage comprising two curved spring tubes flattened in cross section and closed against communication with one another, means connecting adjacent ends of said tubes rigidly together, a rigid support for the opposite end of one of said tubes, indicator-operating means connected to the corresponding opposite end of the other of said tubes, and means for admitting fluid under pressure independently to the said tubes.

7. A differential pressure gage embodying two resilient pressure-measuring elements, an indicator conected to one only of said elements, means for admitting fluid pressures from different sources separately to said elements, excluding the pressure acting in either from the other, said elements being connected together and the one which is not connected to the indicator being fixed, in such manner that pressures of the same character acting in said elements tend to move that part which is connected to the indicator in relatively opposite directions.

In testimony whereof I have affixed my signature.

FRANK H. HOPKINS.